Patented July 15, 1952

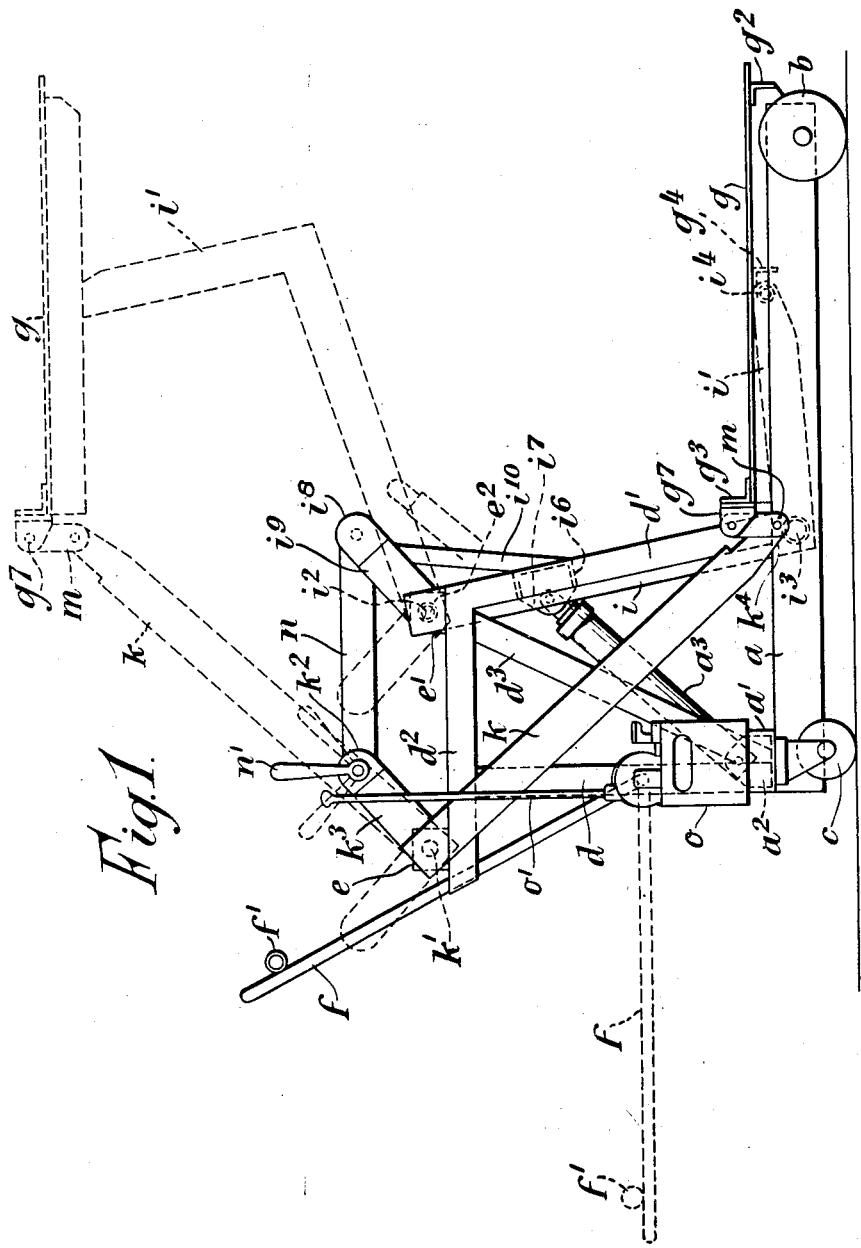

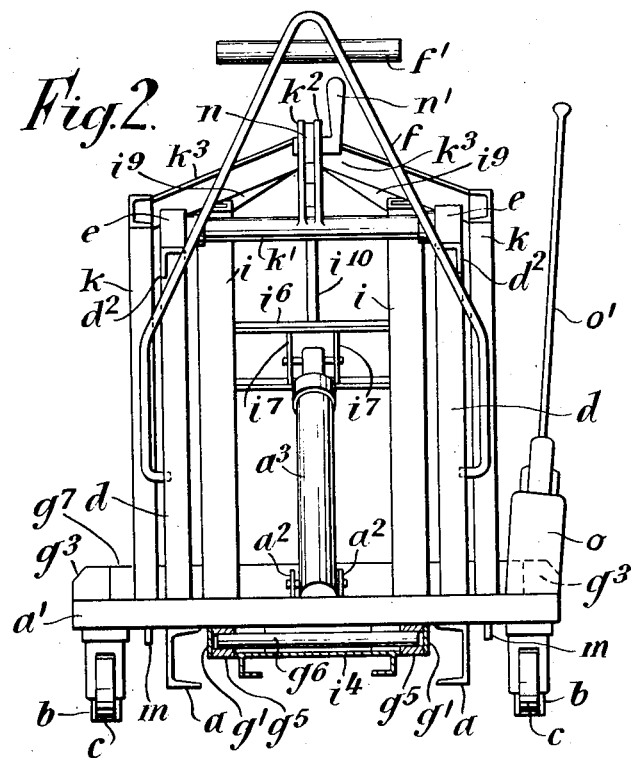
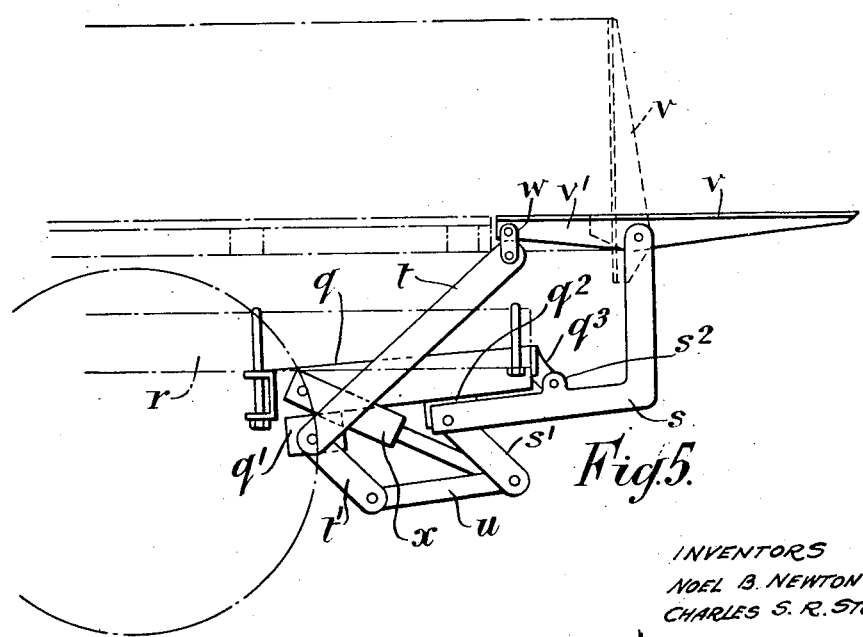

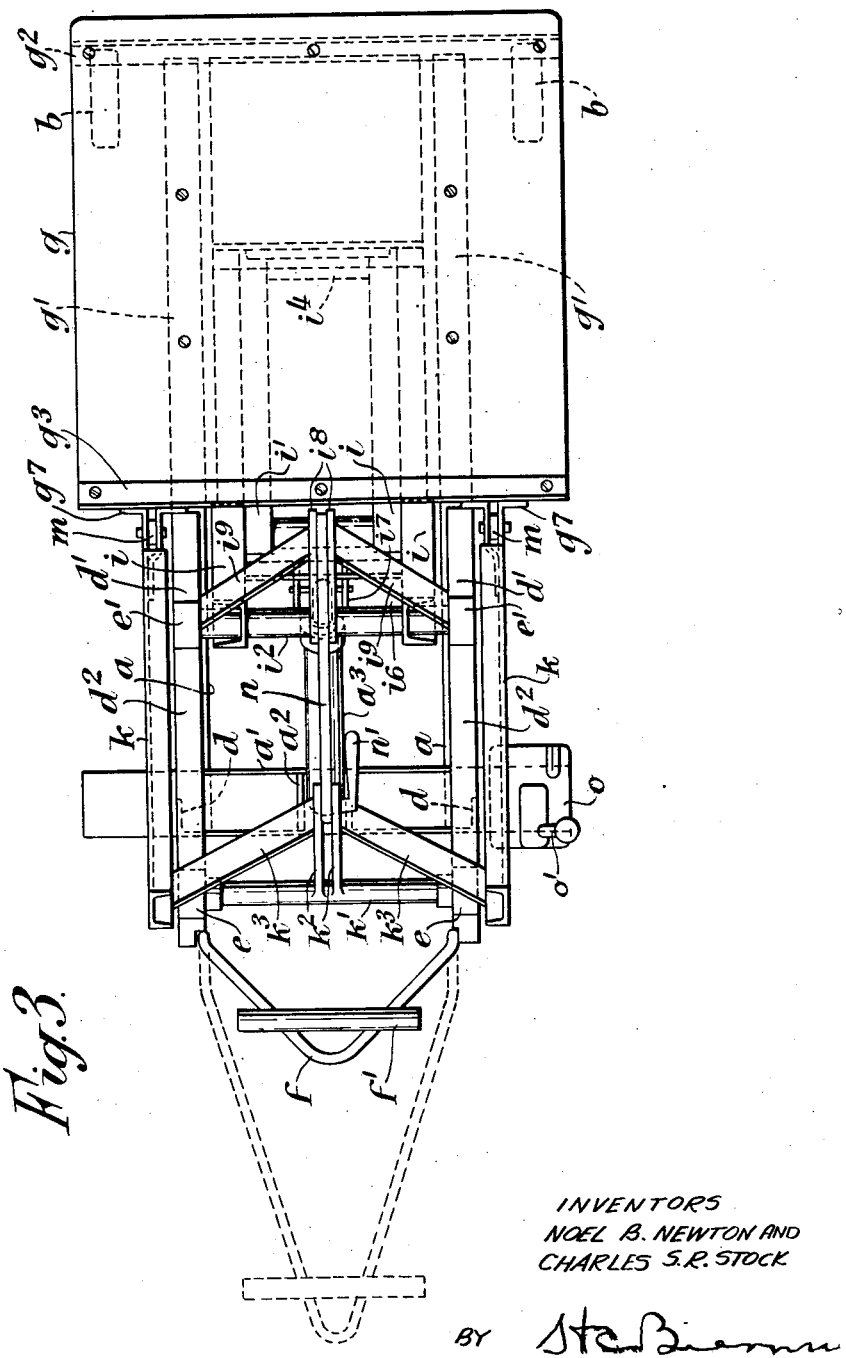

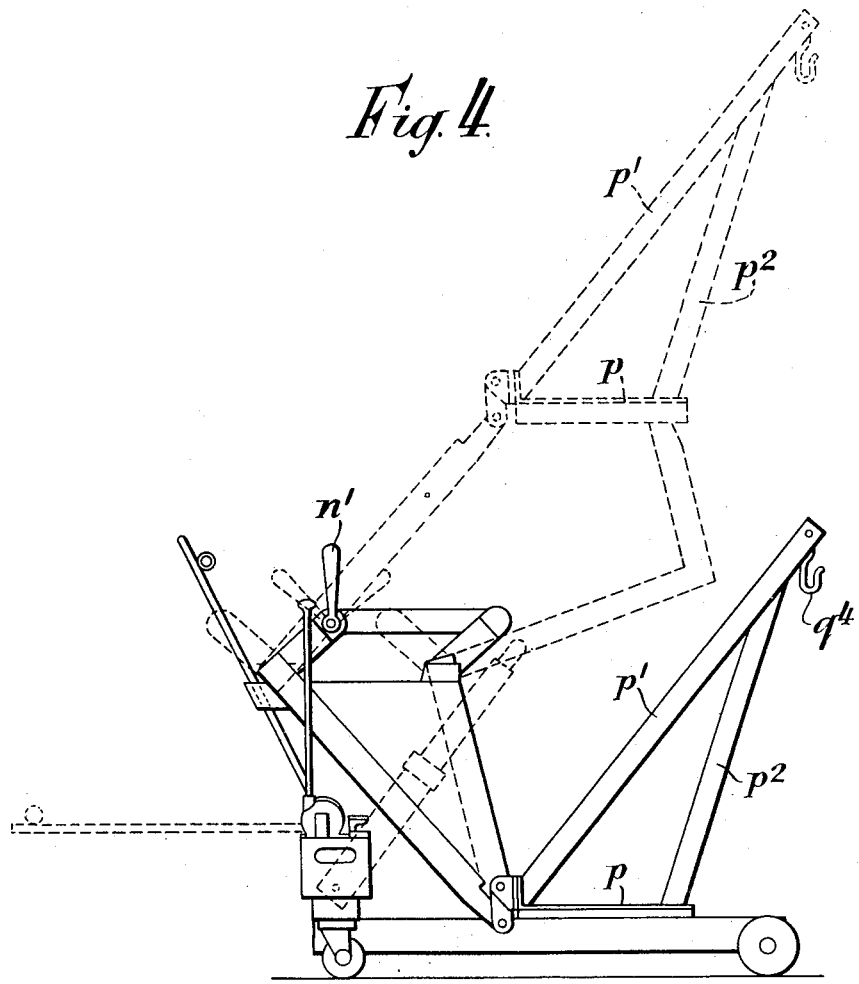

2,603,454

UNITED STATES PATENT OFFICE 2,603,454

ELEVATABLE LOAD PLATFORM FOR VEHICLES

Noel B. Newton, London, and Charles Samuel Roberts Stock, Slough, England; said Stock assignor to said Newton Application September 13, 1949, Serial No. 115,380
In Great Britain October 2, 1948

13 Claims. (Cl. 254—10)

This invention relates to elevating apparatus, that is to say apparatus having a platform or other load-receiving member which can be raised and lowered and which can be used for lifting heavy articles for transport, loading or other purposes. The invention is particularly applicable to transportable elevating apparatus embodying a wheeled chassis on which it may be moved around for receiving, transporting and delivering heavy articles, such use being now generally known as mechanical handling.

In order to have a wide range of use, where the load-receiving member is a platform, such platform must be capable of being lowered close to the ground and of being raised to a considerable height, and the platform must have a high degree of stability both transversely and longitudinally in all positions of elevation to allow for unequal distribution of load thereon, as must inevitably occur during loading or unloading.

Parallel linkage systems are well known for the purpose of controlling the level, for example of the platform of a lifting jack, but their control varies with variation of angularity of their linkage, which becomes relatively ineffective as the linkage system reaches alignment or substantial alignment and moreover apart from such consideration of control, a serious manufacturing problem is met where such linkage system is required to pass through the position of alignment of its links, as will be explained later in more detail.

For some purposes, the load-receiving member instead of being a platform, may be in the form of a jib so as to operate as a crane, for raising a load in suspension, the jib being mounted in the same manner as the platform so that its inclination or uprightness remains the same instead of varying as with a normal crane jib. This feature has considerable advantages for example to enable the machine to be used to raise an engine for fitting to a vehicle chassis, or to raise a heavy chuck or jig for fitting to a machine tool as the overhang of the upper end of the jib does not vary relative to the arm of the jib as the same is raised or lowered.

According to the invention elevating apparatus comprises a base, an elevated superstructure on the base, a platform, parallel bell crank levers pivotally mounted on the superstructure intermediate of their ends, each such lever being pivotally connected by one end to the platform forming a primary parallel linkage system and their other and shorter ends being pivotally connected by a link forming a secondary parallel linkage system, and mechanical lifting means mounted on the base and connected to the bell-crank lever system.

The elevating apparatus aforesaid may include length compensating means connecting the platform to the primary linkage system, the secondary linkage system being so arranged that it does not pass through the position of alignment as the platform is raised and lowered; or means for varying the length of a member of the secondary linkage system whereby the level of the platform may be varied in any of its positions of elevation, the length compensating means permitting the primary linkage to pass through its position of substantial alignment.

In the accompanying drawings:

Fig. 1 is a side elevation of one example of an elevating platform truck made in accordance with the present invention;

Fig. 2 is a rear elevation, and

Fig. 3 is a plan of the truck shown in Fig. 1;

Fig. 4 is a diagrammatic side elevation showing a modified construction as a crane;

Fig. 5 is a diagrammatic side elevation showing a further modification of the invention.

As shown in Figs. 1–3 of the drawing, the elevating platform truck comprises a chassis consisting of longitudinal frame members $a$ and cross members $a'$ and having a pair of front wheels $b$ and a pair of rear castor wheels $c$.

The rear cross member $a'$ has a pair of lugs $a^2$ welded to it for receiving the lower end of a hydraulic jack unit $a^3$. At the rear end of the chassis is a superstructure of angle members consisting of rear uprights $d$, forward inclined uprights $d'$ top longitudinal members $d^2$ and diagonal bracing $d^3$. Attached to the top members $d^2$ are pairs of rear and forward bearing brackets $e$ and $e'$. At the rear of the chassis is a handle $f$, pivotally connected to the uprights $d$ and adapted to be secured as shown in full lines for use in manoeuvring the chassis, or adapted as shown in dotted lines to be lowered for use as a tow-bar; the handle having a cross bar $f'$ forming a hand rail.

The platform consists of a sheet metal top $g$ attached to a frame consisting of longitudinal angle members $g'$ and front and rear angle members $g^2$, $g^3$. Across the centre of the frame is a further angle member $g^4$ where the weight of the platform and its load will be taken. Fixed on the inside of each longitudinal member $g'$ are blocks $g^5$ carrying a fixed spindle $g^6$.

The platform is adapted to be raised and lowered by a system of bell-crank levers arranged with their complementary arms coupled to form primary and secondary parallel link systems. As shown, the forward bell-crank lever which is pivotally mounted at the brackets $a'$ comprises a pair of downwardly inclined channel members $i$ and forwardly extending channel members $i'$, which is made into a rigid structure by welding the upper ends of the channel members $i$ to a top cross tube $i^2$, by welding the lower ends of such channel members $i$ to the rear ends of the members $i'$ and to a cross tube $i^3$ and by welding the forward ends of the members $i'$ to a further cross tube $i^4$. The tube $i^4$ is provided with bushes $i^5$ to form bearings on the fixed spindle $g^6$. The arms $i$ are also braced by a cross channel member $i^6$ to which are welded lugs $i^7$ for the upper end of the hydraulic jack unit $a^3$. The other arm of the forward bell crank lever is formed by a pair of webs $i^8$ welded to the centre of the top tube $i^2$ and inclined bracing members $i^9$ welded at their ends to the webs and to the ends of the members $i$. A triangulating brace $i^{10}$ is also provided between the webs $i^8$ and the member $i^6$. The tube $i^2$ is provided with end bushes, not shown, by which it is mounted on a shaft $e^2$ fixed in the brackets $e'$.

The rear bell-crank lever, which is pivotally mounted at the brackets $e$, $e'$ consists of downwardly extending channel members $k$ which at their upper ends are secured to the ends of a shaft $k'$ journaled in the brackets $e$, $e'$. Near the centre of the shaft are welded the other arms of the bell-crank consisting of a pair of webs $k^2$ which are supported by inclined bracing members $k^3$ welded at their ends to the webs $k^2$ and to the members $k$. The lower ends of the members $k$ are pivotally connected at $k^4$ to shackles $m$ pivoted at their other ends to brackets $g^7$ attached to the ends of the cross member $g^3$ of the platform structure.

The upper ends of the webs $i^8$ and $k^2$ are connected by a link $n$, the connection to $k^2$ being through an eccentric which is rotatable by means of a lever $n'$. On the rear cross member $a'$ is mounted a hydraulic pump $o$ for actuating the hydraulic jack $a^3$, the pump being manually operable by its lever $o'$.

In operation, as shown in Fig. 1, with the lever $n'$ in its central position the effective length of the link $n$ is such that the line joining the axes of the shaft $k'$ and pivot $k^4$ is parallel to the line joining the axes of the shafts $e^2$ and $i^4$ and thus the links $k$ and cranked links $i$—$i'$ form with the platform frame and the superstructure members $d^2$ a parallel link system, herein termed the primary parallel link system, assuming for the moment that the shackles $m$ are not free to swing. Similarly the webs $i^8$ and $k^2$ are parallel and with the link $n$ and superstructure members $d^2$ form another and secondary parallel link system. Because the two systems embody the bell-crank construction above described they are positively coupled for simultaneous movement and therefore the shackles $m$ have their positions positively defined so that in all positions of the platform they are vertical. Thus it is readily the secondary parallel link system which, through the bell cranks determines the level of the platform. It is to be noted that this secondary link system at no time passes through a position of alignment of its linkage. As shown in dotted lines in Fig. 1 it becomes obvious that by moving the eccentric lever $n'$ forward or backward to shorten or lengthen the effective length of the link $n$, the arms of the primary parallel link system will be moved out of their parallel position causing the platform to be tilted slightly backwards or forwards respectively. This tilting would not be possible without the interposition of the shackles $m$ with the eccentric placed as shown. Another important function of the shackles $m$ is to facilitate the passage of the primary parallel linkage system through the position of alignment of its linkage when the axes of the shaft $k'$ and pivot $k^4$ are in line with the axes of the shafts $e^2$ and $i^4$. In such position, but for the shackles $m$ it would be essential that the lengths of the linkage members should be absolutely accurate or very high stresses could arise unless there was slack at the joints of the system. The interposition of the shackles obviously obviates any such stresses while at the same time so linking the rear end of the platform to the members $k$ that the platform level is in this position and all other positions positively controlled by the secondary linkage system.

It is also to be observed from the construction that the platform load is directly supported by the cranked arms $i$—$i'$ from its transverse centre so that only the unequally distributed load is taken by the other members of the two linkage systems, which load will of course be greatest when loading and unloading from the front of the platform. Lateral mal-distribution of load will be taken mainly by the pairs of members forming the cranked arms $i$—$i'$ through the great rigidity provided by the construction which includes especially the torsional strength of the tubes $i^2$, $i^3$ and $i^4$.

It will be obvious that the jack $a^3$ could be otherwise located than as shown and operably connected to some other member of the bell-crank linkage system.

In a modification, as shown in Fig. 4 a shortened platform frame $p$ is employed, to which is attached a jib of triangulated rigid construction consisting of arms $p'$, $p^2$ having their upper ends joined to carry a suspension hook $q$. Obviously, of course, it would be possible to provide sockets on the platform of the arrangement described in Fig. 1 to receive the legs of jib which could be attached thereto when desired or removed when not required. As the platform frame is kept level as in the example first described it will be clear that the inclination of the arms $p'$, $p^2$ remains constant in all positions so that the overhang of the hook $q$ relative to such arms and to the platform frame remains constant. Thus, the crane may be used to lift an engine out of or into a vehicle chassis while suspended from the hook $q$. It will be seen that the eccentric lever $n'$ may be used to provide slight raising or lowering of the hook through tilting of the platform frame $p$. The overhang of the crane jib beyond the forward shaft $i^4$ does of course impose stresses on the parallel linkage system just as would be caused by load at the forward end of the platform plate $g$ of the first example.

As shown in Fig. 5, the lifting device is attached to the rear of a lorry or truck. It comprises a base $q$ adapted to be clamped to the rear ends of the frame members $r$ of the vehicle chassis. The base $q$ has pairs of rear and forward brackets $q'$ and $q^2$ corresponding to the brackets $e$ and $e'$ of Fig. 1. In principle the bell-crank lever construction is the same as that of Fig. 1 and as shown comprises the forward bell crank assembly $s$, $s'$ and rear bell crank assembly $t$, $t'$ with connecting link $u$ between the arms $s'$ and $t'$. The platform consists of a rear portion $v$ and forward portion $v'$ which are articulated but so that the heel of the part $v$ can lock in the manner of a rule joint under the part $v'$. The forward part $v'$ is connected by a shackle $w$ to the arm $t$. In addition, complementary lugs $s^2$ and $q^3$ are provided so that a pin may be inserted to hold the arm $s$ in the raised position. As shown dotted, the rear portion $v$ may be raised to form the tail board for the end of the truck. The hydraulic cylinder $x$ is mounted between the base $q$ and the arms $s'$.

In use, the part $v$ may be lowered into line with the part $v'$ and both parts will form a platform which can be raised and lowered while carrying a load. The hydraulic pressure for the cylinder $x$ may be provided from the engine power of the vehicle, as has been done for a hydraulically actuated tipping truck. The level of the platform during raising and lowering will be controlled in the same manner as described for the first example. Tilting for the platform may be provided by an eccentric located either at one of the pivots of the link $u$ or perhaps more conveniently at the pivot of the arm $s$ to the parts of the platform, but such arrangement is not shown.

The invention is obviously not limited to all the constructional details of the example above described in so far as such details may be modified without departing from the nature of the invention. For instance other mechanical means than a hydraulic jack could be used for providing the elevating force; such means could be power actuated instead of manually and the apparatus could be mounted on a stationary base or some other base instead of a wheeled chassis as shown and described.

One advantage of the improved construction of elevating apparatus is that it has a high factor of elevation combined with maximum level control of the platform or other load-receiving member.

A further advantage is that it enables a parallel linkage system to be used, part at least of which is capable of passing through the position of alignment of its links but modified to overcome the aforesaid manufacturing problem and without loss of level control for the load-receiving member, and by this means a shorter linkage system can be used.

A still further advantage where the load-receiving member is a platform, is to enable the platform to be given a controlled inclination to facilitate loading on to and from the platform, or as a means of fine adjustment for raising or lowering a suspended load.

What we claim is:

1. Elevating apparatus comprising a base, an elevated superstructure on the base having front and rear sides, a platform at the front of said base, pairs of bell crank levers pivotally mounted at the upper part of the superstructure on each side thereof, said bell crank levers being pivoted intermediate their ends on horizontally spaced pivots, the rear lever of each pair being outside of the front lever, so as to be able to pass the same, one arm of each lever extending forward and downward and being pivotally connected to the platform at horizontally spaced points to form a primary parallel linkage system with such pivots forming a parallelogram with the lever pivots, link means connecting the free ends of the other arms of the bell crank levers to form a secondary parallel linkage system such pivots also forming a parallelogram with the lever pivots, and means holding the bell crank levers on one side of the superstructure parallel with those on the other side.

2. Elevating apparatus according to claim 1 including a length-compensating shackle link connecting the platform to one lever arm on each side of the platform, the bell cranks being of such angle that in the position of half elevation of the platform the secondary parallel linkage system forms a rectangular figure.

3. Elevating apparatus according to claim 1, including a length-compensating shackle link connecting the platform to one lever arm on each side of the platform, the bell cranks being of such angle that in the position of half elevation of the platform the secondary parallel linkage system forms a rectangular figure and further characterised by means at one of the pivots for varying the distance between a pair of horizontally related pivots of the secondary linkage system whereby the lever arms of both systems are moved out of parallel and the level of the platform thereby varied while in any of its positions of elevation, the length-compensating means permitting the forward arms of the bell crank levers to pass through out of parallel.

4. Elevating apparatus according to claim 1 wherein the platform is supported at each end of its transverse center line by one pivot of the forward arms of the front bell crank levers.

5. Elevating apparatus according to claim 1 wherein the platform is supported at each end of its transverse center line by one pivot of the forward arms of the front bell crank levers and wherein the forward arms of the front bell crank levers are cranked so as to lie below the platform when in the lowered position.

6. Elevating apparatus according to claim 1 wherein the platform is supported at each end of its transverse center line by one pivot of the forward arms of the front bell crank levers and wherein mechanical elevating means is located between the base and the said forward arms of the front bell crank levers.

7. Elevating apparatus according to claim 1 further characterised in that the means for holding the bell crank levers on one side parallel with those on the other side comprises shafts extending between immediately opposite bell crank levers.

8. Elevating apparatus according to claim 1 further characterised in that the arms of the bell crank levers forming parts of the secondary parallel link system are inwardly bent towards each other and connected by a common link.

9. Elevating apparatus comprising a base, an elevated superstructure on said base having front and rear sides, a movable platform, front and rear bell crank levers pivoted intermediate their ends on horizontally spaced pivots on said superstructure, the lower arms of said levers extending downwardly and forwardly in parallel relation and pivoted to said platform, the upper arms of said levers extending upwardly and forwardly in parallel relation, a link joining said upper arms, said link being parallel to the line joining said horizontally spaced pivots, said upper arms being shorter than said lower arms.

10. Elevating apparatus according to claim 9 further characterized in that a shackle is interposed between one of said levers and said platform, and a lever actuated means for varying the effective length of said link.

11. Elevating apparatus according to claim 9 further characterized in that a hydraulic ram mounted on said base is directly connected to one of said levers at a point between said platform and the pivot of said lever.

12. Elevating apparatus according to claim 1 further characterized in that a shackle is interposed between one of said levers and said platform, and a lever actuated means for varying the effective length of said link.

13. Elevating apparatus according to claim 1 further characterized in that a hydraulic ram mounted on said base is directly connected to one of said levers at a point between said platform and the pivot of said lever.

NOEL B. NEWTON.
CHARLES SAMUEL ROBERTS STOCK.

REFERENCES CITED

The following references are of record in the file of this patent:

UNITED STATES PATENTS

| Number | Name | Date |
|---|---|---|
| 1,141,928 | Brown | June 8, 1915 |
| 1,561,694 | Clutter | Nov. 17, 1925 |
| 2,044,857 | Pfauser | June 23, 1936 |
| 2,414,684 | Wohlforth | Jan. 21, 1947 |
| 2,449,212 | Fraga | Sept. 14, 1948 |
| 2,454,840 | Ryan | Nov. 30, 1948 |
| 2,480,528 | Wachter | Aug. 30, 1949 |
| 2,500,815 | Gerli | Mar. 14, 1950 |
| 2,505,823 | Braun | May 2, 1950 |